US009457785B2

(12) United States Patent
Howell et al.

(10) Patent No.: US 9,457,785 B2
(45) Date of Patent: Oct. 4, 2016

(54) HEAT-EXCHANGE DRYER APPARATUS, SYSTEM AND METHOD

(71) Applicant: Bendix Commercial Vehicle Systems LLC, Elyria, OH (US)

(72) Inventors: David W. Howell, Oakridge, NC (US); Fred W. Hoffman, Wakeman, OH (US)

(73) Assignee: Bendix Commercial Vehicle Systems, LLC, Elyria, OH (US)

( * ) Notice: Subject to any disclaimer, the term of this patent is extended or adjusted under 35 U.S.C. 154(b) by 776 days.

(21) Appl. No.: 13/664,394

(22) Filed: Oct. 30, 2012

(65) Prior Publication Data

US 2014/0116534 A1     May 1, 2014

(51) Int. Cl.
*B60T 17/02*     (2006.01)
*B60T 17/00*     (2006.01)
*B01D 53/26*     (2006.01)

(52) U.S. Cl.
CPC ........... *B60T 17/004* (2013.01); *B01D 53/261* (2013.01); *B01D 53/265* (2013.01); *B01D 2258/06* (2013.01); *Y10T 137/6416* (2015.04)

(58) Field of Classification Search
CPC ........................ B60T 17/004; B01D 53/261
See application file for complete search history.

(56) References Cited

U.S. PATENT DOCUMENTS

| | | | |
|---|---|---|---|
| 3,854,526 A * | 12/1974 | Cole et al. | 165/71 |
| 3,865,180 A * | 2/1975 | McKenney et al. | 165/111 |
| 3,934,990 A * | 1/1976 | Ide, III | 96/408 |
| 4,026,685 A | 5/1977 | Grix | |
| 4,409,005 A | 10/1983 | McKendrick | |
| 4,544,385 A | 10/1985 | Tanaka | |
| 4,707,166 A | 11/1987 | Khosropour | |
| 4,755,196 A | 7/1988 | Frania et al. | |
| 5,002,593 A * | 3/1991 | Ichishita et al. | 96/137 |
| 5,205,314 A | 4/1993 | Moore | |
| 5,256,172 A | 10/1993 | Keefer | |
| 5,334,230 A | 8/1994 | Sloka | |
| 5,427,609 A | 6/1995 | Zoglman et al. | |
| 5,522,150 A * | 6/1996 | Schultz | 34/80 |
| 5,622,544 A * | 4/1997 | Shamine et al. | 96/134 |
| 6,128,825 A * | 10/2000 | Cunkelman | 34/79 |
| 7,097,696 B2 | 8/2006 | Salzman et al. | |
| 7,789,950 B2 * | 9/2010 | Hoffman et al. | 96/134 |
| 2003/0141758 A1 * | 7/2003 | Ernstberger et al. | 303/86 |
| 2005/0077779 A1 * | 4/2005 | Goodell | B01D 53/261 303/1 |
| 2008/0087167 A1 * | 4/2008 | Wright et al. | 96/4 |
| 2008/0263892 A1 * | 10/2008 | Nichols | 34/419 |
| 2008/0289505 A1 * | 11/2008 | Milomo | 96/134 |

FOREIGN PATENT DOCUMENTS

| | | |
|---|---|---|
| EP | 73895 A1 | 3/1983 |
| WO | WO2005075927 A1 | 8/2005 |

OTHER PUBLICATIONS

Bendix, Bendix Service Data SD-08-2414, Bendix(R) AD-IP Integral Purge Air Dryer, May 2007, pp. 1-28.

* cited by examiner

*Primary Examiner* — Bradley King
(74) *Attorney, Agent, or Firm* — Mathews Law Firm LLC

(57) ABSTRACT

Various embodiments of a heat-exchange dryer apparatus are disclosed. In one embodiment, a heat-exchange dryer apparatus includes a desiccant cartridge comprising desiccant material, a purge-air reservoir secured to the desiccant cartridge, and a compressed-air conduit disposed inside the purge-air reservoir. In another embodiment, a vehicle air-brake system includes an air compressor, a desiccant cartridge comprising desiccant material, and a heat exchange dryer apparatus disposed between the compressor and the desiccant. The temperature of the compressed air is decreased while the temperature of the purge air is increased and the desiccant adsorbs a greater amount of contaminants form the compressed air for improved drying.

38 Claims, 4 Drawing Sheets

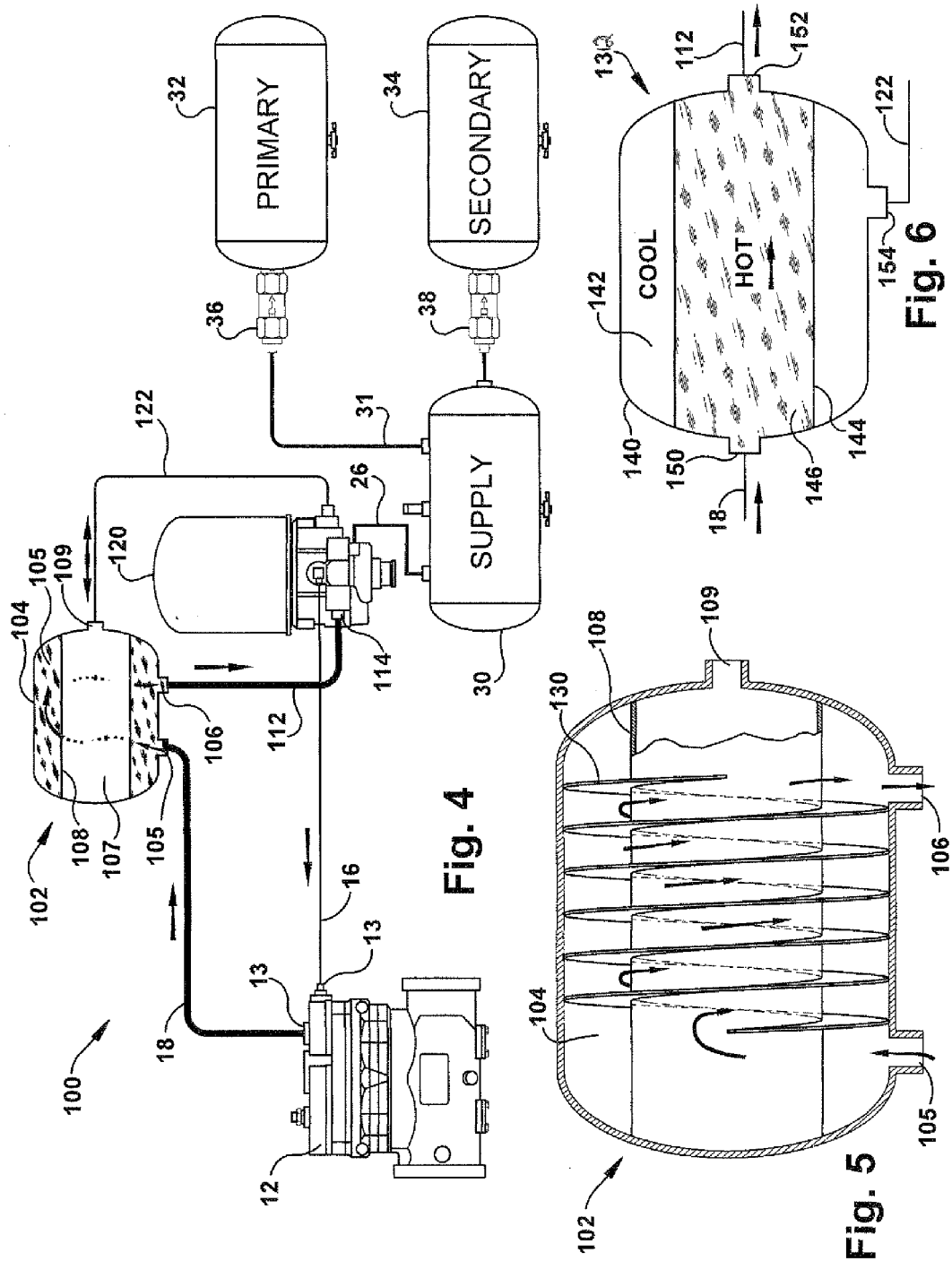

HEAT-EXCHANGE DRYER APPARATUS, SYSTEM AND METHOD

BACKGROUND

The present invention relates to an air-brake dryer apparatus and dryer system for use in commercial vehicles.

Commercial vehicles such as trucks and buses and other large commercial vehicles are typically equipped with a compressed air system in which the brakes of the vehicle are actuated by compressed air. Typically, an air compressor is operated by the vehicle engine and generates pressurized air for the operation of air brakes and other devices that rely on pneumatic air. The operation of an air compressor inherently raises the temperature of the air and also produces contaminants such as oil. The accumulation of water, oil and other contaminants present problems that can adversely affect the operation of the brake system and other devices that rely on the compressed air. During cold weather, for example, the moisture entrained in the air brake system may freeze and cause the components of the air brake system to freeze, thus rendering the system inoperable. At the other extreme during hot weather conditions, the compressed air can accommodate a higher concentration of moisture flowing through the system.

Vehicle air systems generally include a filter and a desiccant air-dryer to remove contaminants that accumulate, for example, coalesced oil, oil vapor and water vapor of the compressed air. The desiccant can also be regenerated, however, during the hot weather conditions, a greater accumulation of moisture and other contaminants can cause the desiccant to become saturated. In addition, a higher concentration of oil can coat the desiccant and the dryer will cease to perform the functions of providing dry air.

SUMMARY

Various embodiments of a heat-exchange dryer apparatus are disclosed. In one embodiment, a heat-exchange dryer apparatus for a vehicle air-brake system includes a desiccant cartridge comprising desiccant material, a housing of a purge-air reservoir secured to the desiccant cartridge, and a compressed-air conduit disposed inside the housing of the purge-air reservoir.

In another embodiment, a heat-exchange dryer apparatus comprises a desiccant cartridge containing desiccant material, a compressed-air conduit in fluid communication with the desiccant material, and a housing of a purge-air reservoir is disposed remote from the desiccant cartridge and nested in the compressed-air conduit.

In another embodiment, an air-brake dryer system for commercial vehicle includes an air compressor and a heat-exchange dryer apparatus. The heat-exchange dryer apparatus includes a desiccant cartridge comprising desiccant material, and a first vessel and a second vessel disposed between the compressor and the desiccant material and the vessels are arranged such that the second vessel is nested in the first vessel.

Various methods for drying air in a vehicle air-brake system are also disclosed. In one embodiment a method includes passing compressed air that has exited a compressor against a first surface of a wall that is in contact with purge air on the opposite surface, and followed by passing the compressed air through a desiccant material. The temperature of the compressed air is decreased while the temperature of the purge air is increased. The desiccant adsorbs a greater amount of contaminants form the compressed air for improved drying.

BRIEF DESCRIPTION OF THE DRAWINGS

The various embodiments of the present invention can be understood with reference to the following drawings. The components in the drawings are not necessarily to scale. Also, in the drawings, like reference numerals designate corresponding parts throughout the several views.

FIG. 4 is a schematic representation of a commercial vehicle air brake system, according to another embodiment of the invention.

FIG. 5 is a schematic illustration of a portion of heat-exchange dryer apparatus, according to an embodiment of the present invention; and FIG. 6 is a schematic illustration of a portion of heat-exchange dryer apparatus showing the internal components, according to an alternative embodiment of the present invention.

DETAILED DESCRIPTION

Figure 1:
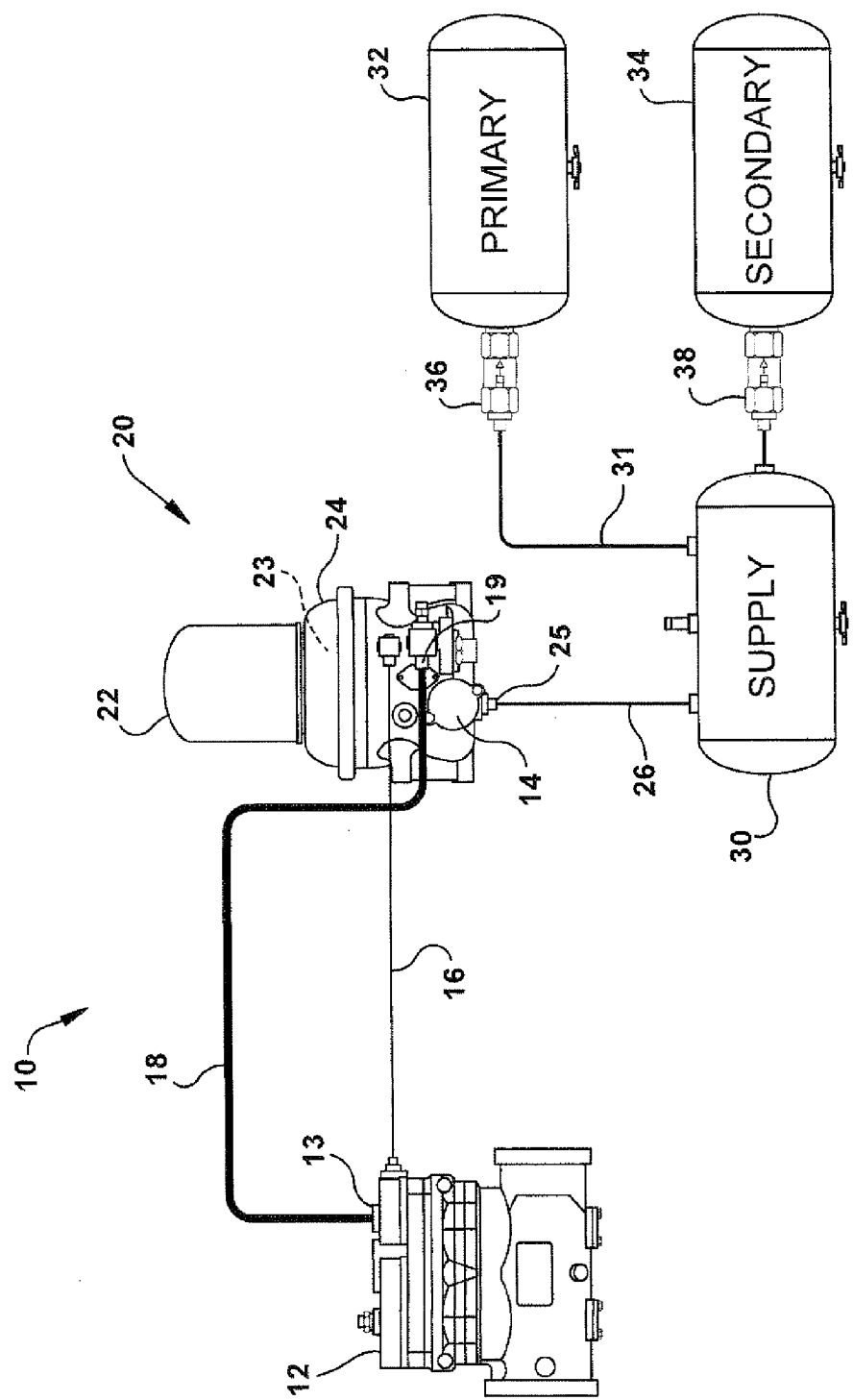
FIG. 1 is a schematic illustration of components of the air-brake system in a commercial vehicle, according to an embodiment of the invention.

FIG. 1 illustrates a schematic representation of a vehicle air-brake system 10 in accordance with an embodiment of the present invention. Although the detailed description of this invention describes the invention in specific relation to a compressed air system used in a heavy truck brake system, one skilled in the art should appreciate that the scope of this invention includes compressed air systems used in other vehicles, including other commercial vehicles, to operate brakes as well as other pneumatically-operated devices.

An air compressor 12 is the source of compressed air and can be driven by a vehicle engine (not shown) in a conventional manner. The cycling on and off of the compressor 12 is controlled by a governor 14 which transmits signals to compressor 12 via control line 16. Pressurized air exits the compressor 12 and passes through a heat-exchange dryer apparatus 20 which includes a desiccant cartridge 22 that contains desiccant material (not shown) and a purge-air reservoir 23 contained by a vessel or housing 24. Moisture, oil and other contaminants are usually removed from the pressurized air before it is stored in supply tank 30 for use in the air brakes and other downstream uses. The vehicle air-brake system 10 may include additional storage tanks such as primary reservoir 32 and secondary reservoir 34 so that the volume of treated air reserved for the braking system is within specified safety guidelines. Check valves 36 and 38 prevent backflow of treated air out of the storage tanks 32 and 34, respectively.

To ensure adequate supply of compressed air for the brakes, the vehicle air-brake system typically operates at two different modes known as the charging mode and the purging mode. The air-brake system operates within a pressure that generally ranges from about 130 psi to about 180 psi. During operation of the vehicle a portion of the compressed air supply is depleted when the brakes are applied by the driver. As a result the pressure of the system drops downstream from the compressor. Additional treated air is needed for the system. The governor 14 signals this pressure drop to the compressor 12 via control line 16 and initiates the charging mode. During the charging mode the compressor 12 generates additional compressed air and feeds the compressed air through the compressor discharge line 18 and to the inlet port 19 of the heat-exchange dryer apparatus 20. The compressed air flows into the vessel or housing 24 of the purge-air reservoir 23 portion of the heat-exchange dryer apparatus 20 and is treated by the desiccant contained in desiccant cartridge 22, as will be further explained in detail below. The treated air flows out of the heat-exchange dryer apparatus 20 via supply port 25 and through supply line 26 to the supply tank 30 and also to supply tanks 32 and 34 via air lines 31 and 33, respectively. Treated air also flows into the vessel or housing 24 of the purge-air reservoir 23.

Figure 2:
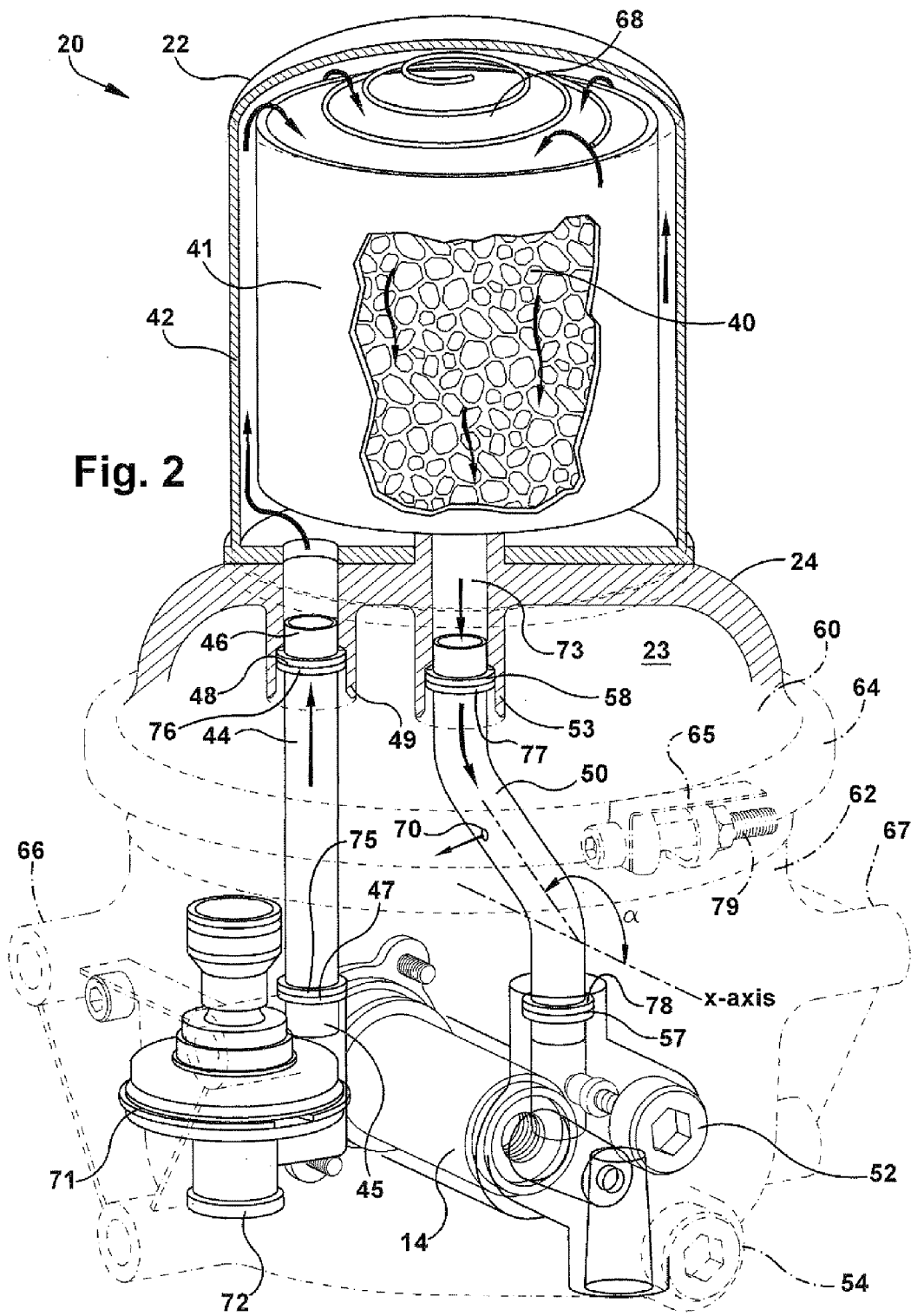
FIG. 2 is a perspective view of a heat-exchange dryer apparatus showing the internal components, according to an embodiment of the present invention.

The vehicle air-brake system 10 remains in the charge cycle until the pressure builds to a predetermined cutout pressure set on the governor 14. At the cutout pressure, the compressor 12 unloads and air compression is stopped. Once the compressor is stopped the purge cycle begins in order to regenerate the desiccant for the next charge cycle. The governor 14 signals a purge valve 71 (FIG. 2) disposed in the vessel or housing 24 of the purge-air reservoir 23 to open which causes the pressure inside the purge-air reservoir to drop. As a result of the pressure differential the treated purge air is forced back through the desiccant and pulls the water and other contaminants back out of the desiccant. Check valves throughout the system, for example check valves 36 and 38 prevent the treated supply air from being bled back into the purge-air reservoir 23 as it is gradually depressurized. The reduction of the pressure also exhausts the compressed air surrounding the desiccant in the desiccant cartridge 22, which rapidly carries out the moisture, oil droplets and other contaminates entrained on the desiccant material through purge valve in the purge-air reservoir 23 and out to the environment. The purge-air reservoir 23 can remain open to the environment and the pressure within the heat-exchange dryer apparatus 20 can remain reduced until the governor 14 signals the compressor 12 to charge. When the pressure in the supply reservoirs 30, 32 and 34 drop below a predetermined level caused by use of the vehicle's air brakes, the charge cycle begins again and the compressor 12 begins to compress air and purge valve disposed in the vessel or housing 24 of the purge-air reservoir closes thereby permitting heat-exchange dryer apparatus 20 to clean and dry the compressed air entering from compressor discharge line 18 and into the inlet port 19. FIG. 2 is a perspective view of heat-exchange dryer apparatus 20 of vehicle air-brake system 10 (FIG. 1). In one embodiment, heat-exchange dryer apparatus 20 includes a desiccant cartridge 22 comprising desiccant material 40, and a vessel or housing 24 containing purge-air reservoir 23 that is secured to the desiccant cartridge. Desiccant material 40 is contained within desiccant enclosure 41 such that an annular space 42 exists between desiccant enclosure 41 and cartridge 22. Heat-exchange dryer apparatus 20 also includes a compressed-air conduit 44 disposed inside the vessel or housing 24 of the purge-air reservoir. The compressed-air conduit is positioned within the air-brake system between the compressor 12 and the desiccant material 40. As shown in one embodiment of FIG. 2, the compressed-air conduit 44 is disposed inside the vessel or housing 24 of the purge-air reservoir such that the compressed-air conduit is surrounded by purge air contained in the purge-air reservoir 23. In one example arrangement the compressed-air conduit 44 is in fluid communication with an inlet port 19 (FIG. 1) of the purge-air reservoir housing 24 and the desiccant material 40.

Compressed-air conduit 44 has a proximal end 45 and a distal end 46, both of which can be connected or secured in different arrangements. For example, the proximal end 45 of compressed-air conduit 44 can be connected directly to the inlet port 19 of the purge-air reservoir housing 24 and the distal end 46 connected to an outlet port 49 of the purge-air reservoir housing 24. In another arrangement, a purge-valve assembly 71 is disposed between the inlet port 19 and the compressed-air conduit 44, and therefore, the proximal end 45 of compressed-air conduit is connected to purge-valve assembly 71 and the distal end 46 is connected to the outlet port 49 of purge-air reservoir housing 24. Outlet port 49 is proximate annular space 41 and the compressed air that flows inside the compressed-air conduit is directed into the secured desiccant cartridge 20 along annular space 42. The compressed air is cooled by the purge air that resides inside the vessel or housing 24 of the purge-air reservoir and is further cooled via "skin cooling" by heat transfer along the desiccant cartridge 22 that is exposed to the atmosphere. Compressed-air conduit 44 can include crimped sections that forms shoulder 75 near the proximal end 45 and shoulder 76 near the distal end 46. The shoulders accommodate seals 47 and 48, respectively, to pressure-seal the compressed-air conduit 44 within the purge-air reservoir housing 24.

Heat-exchange dryer apparatus 20 also includes a treated-air conduit 50 positioned within the purge-air reservoir 24 such that it is in fluid communication with the desiccant material 40 and supply port 52, and an optional second supply port 54. Treated air from the desiccant material 40 flows through treated-air conduit 50 and through at least one supply port 52, 54 to the supply tank 30 (FIG. 1). Treated-air conduit 50 has a proximal end that is connected to an inlet port 53 of the housing 24 of the purge-air reservoir and a distal end that is secured to an outlet port of the housing 24. Treated-air conduit 50 also has crimped sections that form shoulders 77 and 78 for placement of internal seals 57 and 58, for example o-ring seals. Treated-air conduit 50 includes an opening 70 that allows the treated air to flow between the treated-air conduit 50 and the purge-air reservoir inside the housing 24. For example, a portion of the treated air flowing through treated-air conduit 50 is purge-air retained in the purge-air reservoir 24 when the air is flowing from the desiccant cartridge to the outlet port, for example supply ports 52, 54, of the housing 24. The opening 70 can also be located in purge-air reservoir housing 24 along channel 73 where treated air exits the desiccant and enters the treated-air conduit.

Compressed-air conduit 44 is shown as a vertical pipe and the shape of treated-air conduit 50 is shown as having a slight "S" curve and is oriented at an angle, α, of at least zero degrees relative to the horizontal axis, as denoted by axis X. The angle alpha can range from zero degrees to 180 degrees. Compressed-air conduit 44 and treated-air conduit 50 may straight, curved or sloped to include bends and curves of various slopes, provided the slope of any section is greater or equal to zero. The compressed-air conduit 44 and treated-air conduit 50 should not have any changes in the direction of the slope, for example, both a positive and negative slope, so as to create valleys where condensed fluid or contaminants may collect or pool. Condensed fluids that collect in compressed-air conduit 44 and treated-air conduit 50 could freeze in cold weather and create blockages in the air-brake system.

The profile shapes and dimensions of compressed-air conduit 44 and treated-air conduit 50 can vary. For example, the conduits have a circular cross-section, however, several alternative cross-sections, for example, rectangular, oval, polygonal, etc., may be used. The diameter or cross-section dimensions can also vary. For example, the dimensions of the conduit can have an outer diameter that ranges from 0.25 to 1 inch, or in another embodiment a nominal outer diameter that is approximately 0.625 inch and a wall thickness of 0.035 inches.

The heat-exchange dryer apparatus 20 described above facilitates a heat transfer between the untreated air in the compressed-air conduit and the treated air that resides in the housing 24 of the purge-air reservoir 23. In one embodiment, the compressed-air conduit 44 is made of a material that has a high heat transfer coefficient, for example, a heat transfer coefficient that is at least about 100 W/mK., in another embodiment, from about 100 W/mK to about 300 W/mK, and in another embodiment from about 120 W/mK to about 300 W/mK. The conduit 44 can be made of high thermal conductivity materials, including but not limited to, aluminum, copper, gold, silver, brass and alloys or mixtures thereof. During the charging cycle described above, the compressed air generated by the compressor is passed against the inside surface of compressed-air conduit 44 which is in contact with the purge air on the opposite wall surface, the outside surface of compressed-air conduit 44. The heat conducts through the wall of the compressed-air conduit 44 to increase the temperature of the purge air and to decrease the temperature of the incoming compressor air. Accordingly, materials having a greater heat transfer coefficient will affect a greater heat transfer between these untreated and treated air fluids.

Upon completion of the charge mode described above with respect to FIG. 1, the purge mode eliminates the accumulated water and contaminants from the system and reactivates the desiccant material. The liquid and contaminants that are ejected out of the purge valve assembly 71 when the governor 14 provides a signal for the purge mode. Purge valve assembly can include a hose adaptor 72 if it is desirable to attach a hose or fitting to convey the purge residue. The drop in pressure in the purge-air reservoir 23 causes the purge air to flow in the reverse direction and through the opening 70 of treated-air conduit 50. The purge air flows through the desiccant cartridge and through the compressed-air conduit 44 to regenerate the desiccant material 40. The purge air which was heated via contact with the compressed-air conduit 44 during the charge cycle is warmer for better regeneration of the desiccant.

In summary, during operation of the vehicle air-brake system 10 (FIG. 1) in the charge mode, hot compressed air generated by the compressor 12 enters the heat-exchange dryer apparatus 20 through inlet port 19 of purge-air reservoir housing 24. The hot air travels through the compressed-air conduit 44 and heat is transferred through the conduit to the relatively cooler purge air that resides in the purge-air reservoir housing 24. The compressed air moving to the desiccant becomes cooler and moisture condenses within the compressed-air conduit 44 and a greater amount of contaminants are adsorbed by the desiccant due to the lower temperature of the air that passes through it. The treated purge air that accumulates in the purge-air reservoir during the charge cycle regenerates the desiccant during the purge cycle as described above. The purge air becomes gradually warmer during the purge mode and therefore, the purge air has a greater capacity to pull water out of the desiccant during the purge cycle that follows.

Accordingly, a method for drying air in the air-brake system of a commercial vehicle includes passing compressed air against a surface of a wall that is in contact with purge air before passing the compressed air through the desiccant. When the compressed air and purge air contact opposite sides of a common wall a heat exchange occurs and the decrease in temperature of the compressed air is gained is reflected in the increase in the temperature of the purge air. The temperature gradients of the compressed air and the purge air can vary during the cycle depending upon many factors, including but not limited to, the physical arrangement of the components in the air brake system, the length of the compressed-air conduit, the material composition of the conduit, etc. Compressed air entering the inlet port 19 of purge-air reservoir housing 24 can range for example, from about 150° C. to about 250° C. and may drop several degrees after traveling through heat-exchange dryer apparatus 10.

The desiccant material 40, which can be for example a beaded desiccant material, adsorbs moisture and other contaminants, such as oil, from the pressurized air. The desiccant material is placed inside the cartridge via an enclosure that typically has a generally circumferential wall and creates an annular space between the desiccant material and the desiccant cartridge. A spring 64 maintains pressure on the desiccant material 40 to inhibit movement in the desiccant, for example the desiccant beads.

The vessel or housing 24 of the purge-air reservoir 23 is shown as a two-piece casting 60 and 62, however, in another embodiment the vessel or housing can be an integral or single unit. The top and bottom castings 60, 62 are held together with crimp band 64 via crimp fitting 65 and nut 79. However, the two portions of the reservoir can be secured by a bolt or some other conventional fastening or attachment means. The vessel or housing 24 of the purge-air reservoir 23 also includes mounting brackets 66 and 67 (shown in phantom) to secure onto the vehicle.

Figure 3:
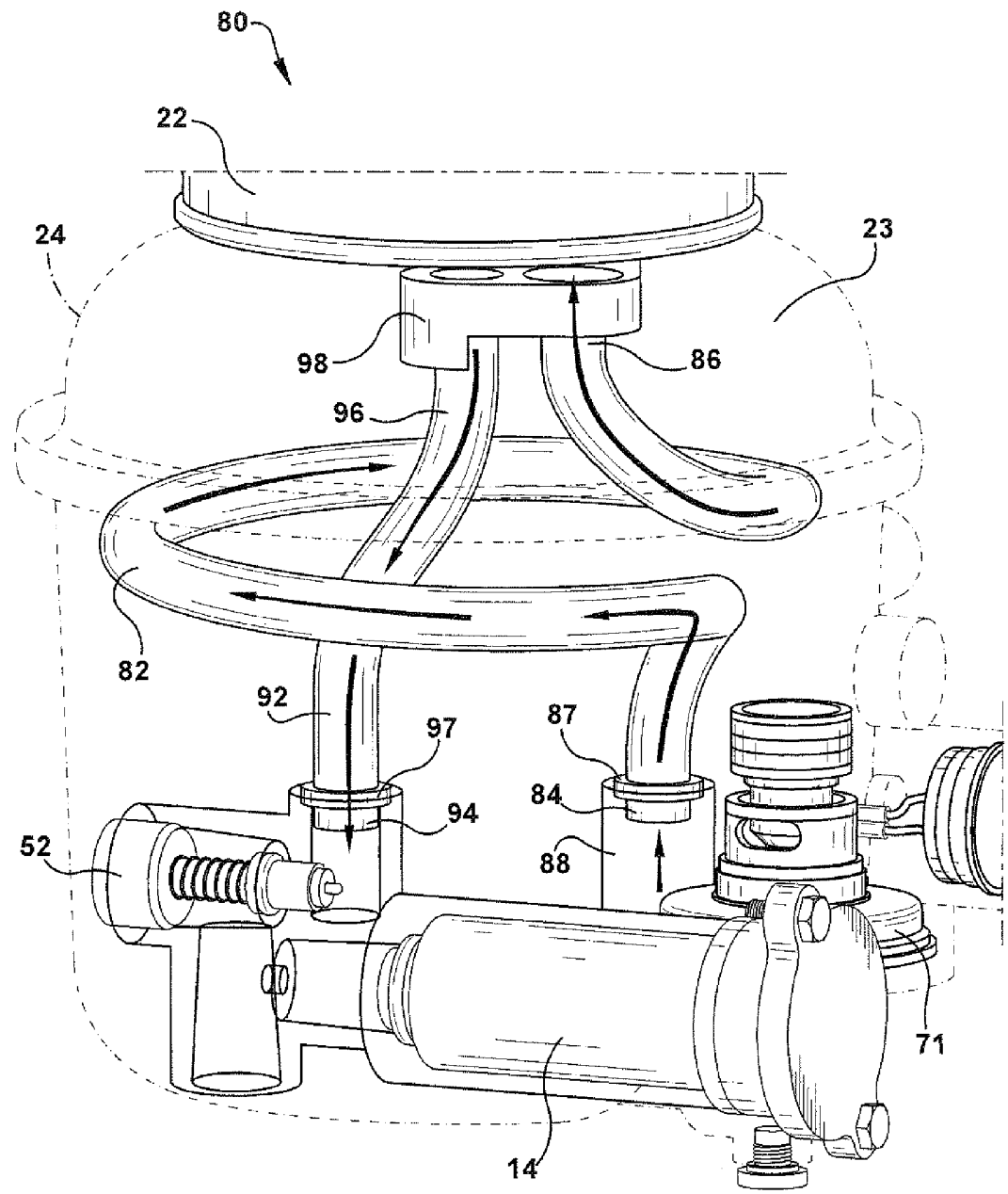
FIG. 3 is a perspective view of an alternative heat exchange dryer apparatus showing the internal components, according to an embodiment of the present invention.

FIG. 3 is a perspective view of another heat-exchange dryer apparatus 80 showing internal components, according to an embodiment of the present invention. Many of the same components such as the governor 14, the purge valve assembly 71, and supply port 52 are included as in heat-exchange dryer apparatus 20 of FIG. 2 but are viewed from another direction. Heat-exchange dryer apparatus 80 has a compressed-air conduit 82 that extends between an inlet port 19 (FIG. 1) at a proximal end 84 and the desiccant cartridge 22 where it is secured by optional coupling 98. Alternatively, compressed-air conduit and treated-air conduit 50 can also be secured by integral couplings 49 and 53 of the housing 24 of the purge-air reservoir as shown in FIG. 2. Treated-air conduit 92 is disposed between coupling 98 and the supply port 52. Compressed-air conduit 82 that has a greater length than the compressed-air conduit 44 (FIG. 2) and therefore has a greater surface area for heat transfer. The winding bends allow for greater length and surface area in the allocated space of purge-air reservoir and housing 24.

In another embodiment of the invention FIG. 4 shows a schematic representation of commercial vehicle air brake system 100 in accordance with another embodiment of the present invention. In this embodiment heat-exchange dryer apparatus 102 includes compressed-air conduit 104 (shown in cross-section), a vessel or shell 108 of a purge-air reservoir 107, and desiccant cartridge 120 containing desiccant 121. In this embodiment the compressed-air conduit 104 and the purge-air reservoir shell 108 are remote from the desiccant cartridge 120 and desiccant material 121. In addition, purge-air reservoir shell 108 is nested within the compressed-air conduit 104.

The charge and purge modes of commercial vehicle air-brake system 100 is similar to that as described according to that described above with respect to system 10 (FIG. 1). During the charge cycle the compressed air flows through outlet port 13 of compressor 12, through compressor discharge line 18, and through inlet port 105 of compressed-air conduit 104. The compressed air then flows around vessel wall or shell 108 of-purge-air reservoir 107 and exits through port 106 and through line 112 to inlet port 114 of desiccant cartridge 120. The air passes through the desiccant 121 and the treated air exits the dryer cartridge through supply line 26 to supply tank 30. A portion of the treated air is sent back to the purge reservoir 107 through port 109 of shell 108 via treated-air conduit 122. The purge air remains inside purge-air reservoir shell 108 throughout the charge cycle. The temperature of the purge air increases as the temperature of the air in the compressed-air conduit 104 decreases. Once the supply tanks and system have reached the cutout pressure, the compressor stops and the purge mode begins. The purge air flows out of port 109 and enters the dryer cartridge 122 to regenerate the desiccant 121.

In any of the embodiments described above, heat-exchange dryer apparatus can further include a baffle or fin to direct air flow and facilitate improved heat transfer between the compressed air and the cooler purge air. FIG. 5 is an expanded view cross-sectional illustration of the compressed-air conduit 104 and purge-air reservoir shell 108 portions of heat-exchange dryer apparatus 102. The cutaway portion of purge-air reservoir shows shell or wall 108 which is contacted on one surface, the outside surface, by compressed air flowing through the compressed-air conduit 104 and contacted on the opposite surface, the inside surface, by air flowing in and out of the purge-air reservoir shell 108. In this embodiment, the shell 108 of the purge-air reservoir 107 and the compressed-air conduit have a common wall. The purge-air of the purge-air reservoir and the compressed-air of the compressed-air conduit contact opposite surfaces of the same wall. The heat transfer can be increased by fin 130, for example a spiral fin, which directs air flowing into port 105 of the compressed-air conduit and spiraled across shell 108 until the air reaches outlet port 106 and out of the purge-air reservoir shell. Fin 130 provides greater surface area through which heat is conducted and facilitates greater temperature changes in the compressed air flowing through the compressed-air conduit 104 and the purge air inside shell 107 inside purge-air reservoir 108. It should be understood that several other alternative designs to facilitate heat transfer can be employed. The wall 108 of purge-air reservoir 107 is made of a material that has a high heat transfer coefficient, for example, a heat transfer coefficient that is at least about 100 W/mK. The purge-air reservoir shell 108 can be made of high thermal conductivity materials, including but not limited to, aluminum, copper, gold, silver, brass and alloys or mixtures thereof.

FIG. 6 is a schematic illustration of a portion of heat-exchange dryer apparatus 132 that can be used in commercial vehicle air brake system 100 of FIG. 4, according to an alternative embodiment of the present invention. In this embodiment vessel or shell 140 of purge-air reservoir 142 is remote from the desiccant dryer 120 similar to the embodiment of heat-exchange dryer apparatus 102 of system 100 described with respect to FIG. 4. The compressed-air conduit 144 containing hot compressed gas 146 is nested in the vessel or shell 140 of the purge-air reservoir 142. Compressed air flowing from the compressor 12 through compressor discharge line 18 enters inlet port 150 of the compressed-air conduit 144 that is at least partially surrounded by the shell 140 of purge-air reservoir 142, and exits port 152 via conduit 112 to dryer desiccant inlet 114 (FIG. 4). A portion of the treated air exiting desiccant dryer 120 is routed to the vessel or shell 140 of the purge-air reservoir 142 via conduit 122 and into the vessel or shell of purge-air reservoir 142 via port 154. The purge air can also exit through conduit 122 or another optional port of the purge-air reservoir vessel or shell 140 to regenerate the desiccant material. The wall or compressed-air conduit 144 is contacted on one surface, the inside surface, by compressed air and contacted on the opposite surface, the outside surface, by air flowing in and out of the purge-air reservoir 142. That is, a wall of purge-air reservoir 142 and the compressed-air 146 have a common wall in the compressed-air conduit 144, and the purge-air of the purge-air reservoir and the compressed-air of the compressed-air conduit contact opposite surfaces of the same wall 144. Heat-exchange dryer apparatus 132 can optionally include a fin 130 (FIG. 5), for example a spiral fin which directs air flowing into port 154 purge-air reservoir 142. Fin 130 provides greater surface area through which heat is conducted and facilitates greater temperature, i.e. to decrease the temperature of the compressed air 146 flowing through the compressed-air conduit 144 and to increase the temperature of the purge air inside vessel or shell 140 of purge-air reservoir 142. It should be understood that several other alternative designs to facilitate heat transfer can be employed.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. It will be appreciated that components of the heat-exchange dryer apparatus, for example such as the desiccant, the purge reservoir and the compressed-air conduit, may adopt a wide variety of configurations and be secured to the vehicle air system in a variety of manners. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. A heat-exchange dryer apparatus for a vehicle air-brake system, the apparatus comprising:
   a desiccant cartridge comprising desiccant material;
   a housing of a purge-air reservoir secured to the desiccant cartridge;
   a compressed-air conduit separate from the housing of the purge-air reservoir and disposed inside the housing of the purge-air reservoir, the compressed-air conduit in fluid communication with the desiccant material; and
   a treated-air conduit separate from the housing of the purge-air reservoir and disposed inside the housing of the purge-air reservoir, the treated-air conduit being separate from the compressed-air conduit.

2. The heat-exchange dryer apparatus of claim 1, wherein the compressed-air conduit is disposed inside the housing of the purge-air reservoir such that the compressed-air conduit is surrounded by purge air contained in the purge-air reservoir.

3. The heat-exchange dryer apparatus of claim 2, wherein the purge-air surrounding the compressed-air conduit contacts the compressed-air conduit.

4. The heat-exchange dryer apparatus of claim 1, wherein the compressed-air conduit comprises a material having a heat transfer coefficient that is at least about 100 W/mK.

5. The heat-exchange dryer apparatus of claim 4, wherein the compressed-air conduit has a first end secured to an inlet port of the housing of the purge-air reservoir and a second end secured to an outlet port of the housing of the purge-air reservoir.

6. The heat-exchange dryer apparatus of claim 4, wherein the compressed-air conduit has a first end secured to a purge-valve assembly of the housing of the purge-air reservoir and a second end secured to the housing of the purge-air reservoir.

7. The heat-exchange dryer apparatus of claim 1, wherein the compressed-air conduit comprises a material selected from the group of: aluminum, copper, brass, gold, silver and alloys thereof.

8. The heat-exchange dryer apparatus of claim 1, wherein the compressed-air conduit is in fluid communication with an inlet port of the housing of the purge-air reservoir and the desiccant material.

9. The heat-exchange dryer apparatus of claim 1, wherein the compressed-air conduit has a first end secured to an inlet port of the housing of the purge-air reservoir and a second end secured to an outlet port of the housing of the purge-air reservoir.

10. The heat-exchange dryer apparatus of claim 1, wherein the compressed-air conduit has a first end secured to a purge-valve assembly of the housing of the purge-air reservoir and a second end secured to the housing of the purge-air reservoir.

11. The heat-exchange dryer apparatus of claim 1, wherein the treated-air conduit comprises an opening that allows the treated air to flow between the treated-air conduit and the purge-air reservoir inside the housing.

12. The heat exchange dryer apparatus of claim 1, wherein the desiccant material is contained in a desiccant enclosure and the desiccant enclosure is positioned inside the desiccant cartridge to form an annular space between the desiccant cartridge and the desiccant enclosure; and
the compressed-air conduit is in fluid communication with the annular space inside the desiccant cartridge.

13. The heat-exchange dryer apparatus of claim 1, wherein the compressed-air conduit inside the housing of the purge-air reservoir comprises a shoulder and a seal disposed thereon.

14. The heat-exchange dryer apparatus of claim 1, wherein the compressed-air conduit inside the purge-air reservoir is oriented at an angle relative to a horizontal x-axis.

15. The heat-exchange dryer apparatus of claim 1, wherein the compressed-air conduit inside the housing of the purge-air reservoir does not have both a positive and negative slope.

16. The heat-exchange dryer apparatus of claim 1, wherein the treated-air conduit is in fluid communication with the desiccant material and has a first end that is secured to an inlet port of the housing of the purge-air reservoir and a second end secured to an outlet port of the housing of the purge-air reservoir.

17. The heat-exchange dryer apparatus of claim 1, wherein the compressed-air conduit comprises aluminum.

18. The heat-exchange dryer apparatus of claim 1, wherein the compressed-air conduit has a greater length than the treated-air conduit.

19. The heat-exchange dryer apparatus of claim 1, wherein the treated-air conduit comprises a material having a heat transfer coefficient that is at least about 100 W/mK.

20. The heat-exchange dryer apparatus of claim 1, wherein the compressed-air conduit is a pipe.

21. The heat-exchange dryer apparatus of claim 1, wherein at least one of the compressed-air conduit and the treated-air conduit has a profile shape that is selected from the group consisting of: circular, rectangular, oval, and polygonal.

22. The heat-exchange dryer apparatus of claim 1, wherein at least one of the compressed-air conduit and the treated-air conduit has an outer diameter that ranges from 0.25 inch to 1 inch.

23. The heat-exchange dryer apparatus of claim 1, wherein the treated-air conduit is in the shape of an "S".

24. The heat-exchange dryer apparatus of claim 1, wherein at least one of the compressed-air conduit and treated-air conduit is secured by integral couplings of the housing of the purge-air reservoir.

25. The heat-exchange dryer apparatus of claim 1, wherein the compressed-air conduit comprises winding bends that provides for greater surface area in the allocated space of purge-air reservoir.

26. The heat-exchange dryer apparatus of claim 1, wherein the treated-air conduit is disposed between a coupling and a supply port.

27. The heat-exchange dryer apparatus of claim 1, wherein the treated-air conduit is disposed inside the housing of the purge-air reservoir such that the treated-air conduit is surrounded by purge air contained in the purge-air reservoir.

28. A method for drying air in an air-brake system of a commercial vehicle comprising:
passing compressed air through a compressed-air conduit disposed inside a housing of a purge-air reservoir and is separate from the housing, wherein the compressed air flows against a first surface of a wall of the compressed-air conduit that is in contact with purge air residing in a purge-air reservoir on a second surface of the wall opposite the first surface; and
passing the compressed air through a desiccant material after contacting the wall to produce treated air, and
passing the treated air into the purge-air reservoir through a treated-air conduit which is separate from the compressed-air conduit and is disposed inside the housing of a purge-air reservoir, the treated-air conduit being separate from the housing.

29. The method of claim 28, wherein passing the compressed air against the wall increases the temperature of the purge air and decreases the temperature of the compressed air.

30. The method of claim 28, wherein the wall has a heat transfer coefficient of at least about 100 W/km.

31. The method of claim 28, wherein the wall comprises a material selected from the group of: aluminum, copper, brass, gold, silver and alloys thereof.

32. The method of claim 28, wherein the purge-air reservoir is secured to a desiccant cartridge comprising desiccant material.

33. The method of claim 28, wherein the method comprises passing a portion of the treated air through an opening of the treated-air conduit and into the purge-air reservoir.

34. The method of claim 28, wherein the compressed-air conduit is surrounded by purge air contained in the purge-air reservoir.

35. The method of claim 28, wherein the method comprises passing the treated air in a reverse direction through the desiccant.

36. The method of claim 28, wherein the method comprises:
   decreasing the temperature of the compressed air in the purge-air reservoir during the charge cycle; and
   condensing moisture within the compressed-air conduit to increase the amount of contaminants adsorbed by the desiccant.

37. The method of claim 28, wherein the method comprises:
   transferring heat from the compressed air of the compressed-air conduit to the purge air accumulated in the purge-air reservoir during the charge cycle; and
   regenerating the desiccant with the heated purge air during the purge cycle.

38. The method of claim 36, wherein the method comprises:
   transferring heat to the purge air accumulated in the purge-air reservoir by the compressed air during the charge cycle; and
   regenerating the desiccant with the heated purge air during the purge cycle.

* * * * *